United States Patent [19]

Solomon

[11] 4,257,507

[45] Mar. 24, 1981

[54] TORQUE WRENCH WITH PAWL GUIDE

[75] Inventor: Donald F. Solomon, Newport Beach, Calif.

[73] Assignee: JO-Line Tools, Inc., Anaheim, Calif.

[21] Appl. No.: 934,045

[22] Filed: Aug. 15, 1978

[51] Int. Cl.³ .......................................... F16D 11/06
[52] U.S. Cl. ....................................... 192/43.1; 81/63
[58] Field of Search .............. 192/43.1; 81/63.2, 63.1, 81/63, 60, 61, 62, 58.1

[56] References Cited

U.S. PATENT DOCUMENTS

| | | | |
|---|---|---|---|
| 3,222,943 | 12/1965 | McDonald | 81/63.1 X |
| 3,290,969 | 12/1966 | Bergquist et al. | 81/63.1 |
| 3,372,612 | 3/1968 | Rozmus | 81/62 |
| 3,783,703 | 1/1974 | Trimble | 81/58.1 X |

*Primary Examiner*—Andrew V. Kundrat
*Attorney, Agent, or Firm*—Fulwider, Patton, Rieber, Lee & Utecht

[57] ABSTRACT

A torque wrench having an elongated hinge terminating in a ratchet ring with interiorally directed teeth has a work head for turning a workpiece and a pawl for selectively rotating the workpiece with rotational movement of the hinge. The pawl is provided with a lip directed radially outward from the axis of rotation of the work head. A corresponding annular groove is defined in the interior wall of the ratchet ring to receive the lip. Tilting or misalignment of the pawl within the cavity defined within the ratchet ring is thereby prevented. In its preferred embodiment, the pawl is equipped with a plurality of ratchet teeth with the lip extending outwardly from the generally convex surface into which the teeth are formed midway between the longitudinal extremities of the pawl perpendicular to the plane of the ratchet ring. The corresponding annular groove in the ratchet ring likewise divides the ratchet teeth into separate portions on either side of the pawl lip.

9 Claims, 5 Drawing Figures

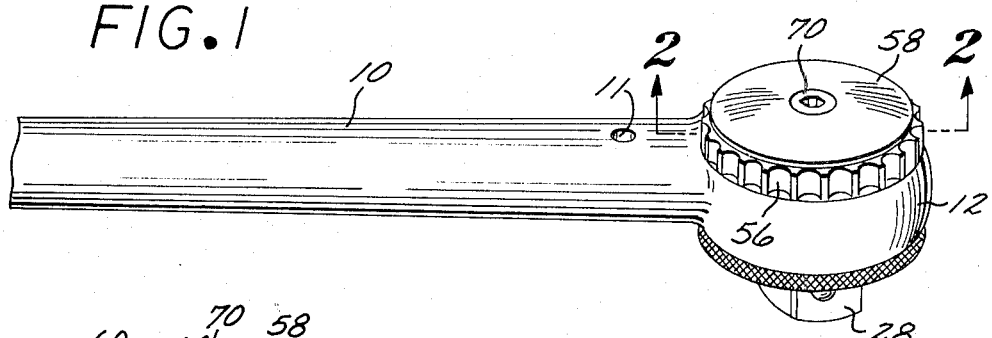
FIG. 1
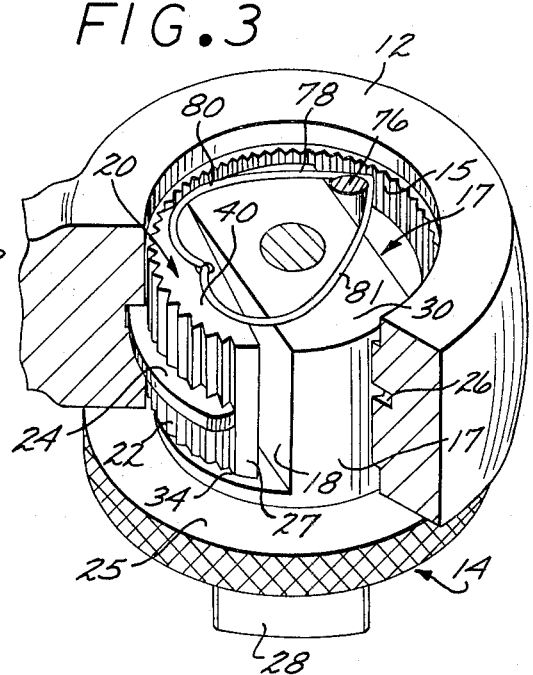
FIG. 2
FIG. 3
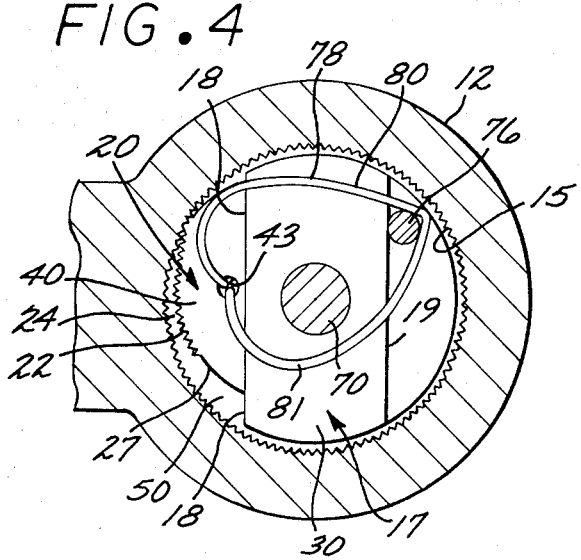
FIG. 4
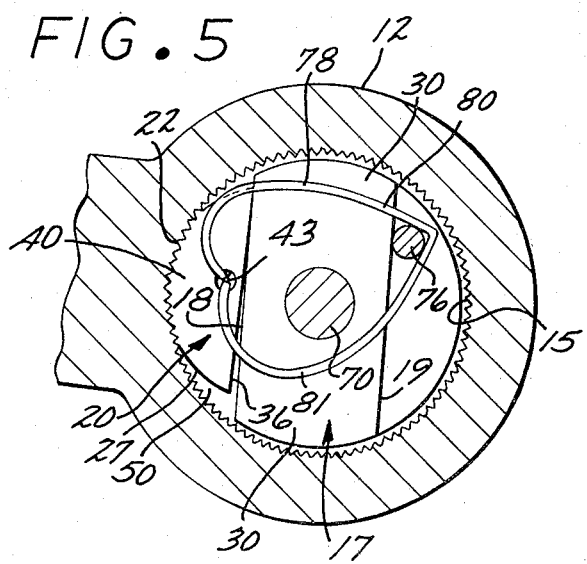
FIG. 5

TORQUE WRENCH WITH PAWL GUIDE

BACKGROUND OF THE INVENTION

1. Field of the Invention

The present invention relate to torque wrenches and ratchet drive arrangements, such as used in socket wrenches and the like.

2. Description of the Prior Art

In conventional torque wrench designs a torque wrench handle includes a member called a hinge, which has an elongated portion extending within a sleevelike handle and terminating at one end beyond the handle in a generally annular ratchet ring. The ratchet ring typically has a generally circular aperture therethrough with radially interiorly directed ratchet teeth defined in the wall thereof. A work engaging element, sometimes called a workpiece or driver is provided and extends into the ratchet ring cavity. The workpiece includes a square lug for engaging a socket wrench or the like protruding outward beyond the ratchet ring and perpendicular thereto along the workpiece axis. The lug normally depends from a disk shaped mounting flange that seats against the ratchet ring in sliding contact therewith. Extending from the disk shaped mounting flange opposite the lug is a configured bearing post which extends the width of the ratchet ring to occupy a major portion of the volume defined by the cavity therein. The bearing post is formed with a chordal shoulder which, together with the toothed interior ratchet ring wall, define a segmental section of the cavity volume not occupied by the pedestal structure. Within this segmental cavity a pawl is disposed to selectively effectuate engagement of the workpiece with the ratchet ring during a rotational stroke of the hinge in one direction, and to allow the ratchet ring to rotate relative to the work head on the return stroke of the hinge. A control member, typically an index ring is positioned over the ratchet ring and carries a depending finger parallel to the axis of work head rotation to manipulate the pawl into position to engage the work head for rotation with the ratchet ring in either direction of rotation, or to disengage it entirely. The user is thereby able to control the direction in which the hinge can be rotated to apply power to the workpiece.

In conventional torque wrenches the pawl is typically formed with flat upper and lower surfaces and with a dog, catch or teeth directed outwardly from the axis of work head rotation for engagement with the ratchet ring.

The pawl is conventionally constrained from movement in the direction of work head rotation and restrained from tipping or tilting within the cavity in which it is held by the snugness of fit of the flat upper and lower surfaces against the disk shaped flange of the work head on the one side and against the interior surface of a cap over the index ring on the other side. Heretofore, failures in a torque wrench mechanism typically occur due to fracture and shearing of teeth in the pawl or in the ratchet ring. Ideally the flat surfaces of the pawl lie in parallel planes perpendicular to the axis of work head rotation and form a very snug fit with the capturing elements to prevent misalignment. However, the closeness of this fit is governed by the sum of production tolerances of the work head, the hinge (including the dimensions of the ratchet ring) the indexing ring, the cap and the pawl. In conventional articles, not even a worst case condition of production tolerances is required to produce a significant gap between the pawl and the confining surfaces parallel to the plane of the ratchet ring. As a consequence, in conventional torque wrenches, the pawl is at the mercy of random initial contact points when it is brought by movement of the hinge to bear against the ratchet ring and the pedestal of the work head. This frequently results in the premature failure of both the pawl and the hinge.

The situation is aggravated even further when the torque wrench operator pulls on the handle at an angle. This is a very frequent occurrence in operating a torque wrench, or a socket wrench, for example, to loosen and tighten nuts and bolts in spaces having limited clearance and leverage room. In operating a torque wrench under such conditions the hinge axis may be canted significantly (2 degrees for example) relative to its normal disposition perpendicular to the axis of rotation of the work head. As torque is applied through the hinge, the initial contact between the teeth of the pawl and the teeth of the ratchet ring is at the extreme edge of the pawl. When torque is applied the pawl rotates until it is restrained by the work head and its related parts. Because of the unsymmetric load applied to the pawl, the teeth of the pawl are held in misalignment with the teeth of the ratchet ring. The fact of this effect can be seen since the failure of the pawl or ratchet ring teeth shows a progressive shear. The shear starts at one edge of a tooth and proceeds to approximately two thirds of the tooth width.

SUMMARY OF THE INVENTION

The present invention involves a torque wrench construction in which the pawl and ratchet ring include means for guidance of the rotational movement of the pawl relative to the ratchet ring. Preferably, the guiding arrangement is provided by an outwardly protruding lip or tang extending from the surface of the pawl used to engage the ratchet ring and into a corresponding channel or groove defined in the ratchet ring. The channel extends radially outward from the interior circumferential toothed wall of the ratchet ring. Both the channel and the lip are aligned in a plane perpendicular to the axis of work head rotation.

By using such a guidance arrangement according to the present invention, any possible skew of the pawl within its confining cavity is minimized. The mechanical tolerances of the pawl guide lip and the groove in the ratchet ring of the hinge are the only tolerances which effect the degree of misalignment which can result. In its worst condition, one of the pawl teeth can fall on top of a tooth crest of the ratchet ring. This is an unstable condition, and the application of torque will necessarily cause slipping of the mating teeth until a stable positive engagement results. Such slipping is nondestructive and does not place shearing stress on either the teeth of the pawl or those of the ratchet ring.

In a preferred embodiment of the invention the lip or tang of the pawl lies approximately midway between the opposing flat surfaces of the pawl that slide relative to the work head and the cap or indexing ring. Any skewing or canting of the pawl within its confining cavity is thereby limited by the distance between the guide and the furthest of the opposing parallel faces. Since this distance is shortest when the guide is located midway through the width of the pawl, such a construction is preferred.

The invention may be defined with greater clarity and particularity by reference to the accompanying drawings.

DESCRIPTION OF THE DRAWINGS

FIG. 1 is a perspective view of a torque wrench constructed according to the invention.

FIG. 2 is sectional view taken along the lines 2—2 of FIG. 1.

FIG. 3 is a perspective cutaway view illustrating the pawl guide arrangement of the invention.

FIG. 4 is a sectional view taken along the lines 4—4 of FIG. 2 illustrating the position of the pawl when the work head is disengaged from the ratchet ring.

FIG. 5 is a view similar to FIG. 4 showing the position of the pawl when the work head is engaged with the ratchet ring.

DESCRIPTION OF THE EMBODIMENT

Referring now to FIG. 1, a torque wrench is shown with an elongated hinge 10 that terminates at one end in a generally annular shaped ratchet ring 12. As illustrated in FIG. 3, the ratchet ring 12 has a centrally located enlarged cavity delineated by an interior arcuate wall formed with a plurality of equally spaced ratchet teeth depicted collectively at 15. A work head or driver element 14 has an upright contoured bearing post 17 defined with chordal bearing walls 18 and 19. A pawl 20 has an outer convex arcuate surface with exteriorally directed teeth, indicated collectively at 22. The teeth 22 mesh with the ratchet teeth 15. The pawl 20 is selectively operable to couple the work head 14 and the ratchet ring 12 in rotation. A guide for minimizing the degree to which the pawl 20 can be skewed relative to the ratchet ring 12 is provided by a projecting lip or tang 24 extending outward from the convex surface of the pawl 20 bearing the teeth 22. The lip 24 is longitudinally aligned with a generally annular radially outwardly directed groove or channel 26 defined in the interiorally facing arcuate wall of the ratchet ring 12. The lip 24 and the channel 26 are longitudinally aligned so that the lip 24 rides in registration within the channel 26.

With reference to FIG. 1, the ratchet hinge 10 and the ratchet ring 12 can be formed from a single steel casting or forging as shown. A handle (not shown) may form a sheath or sleeve encircling the hinge 10 and rotatably attached thereto by a bolt extending through the hinge 10 at an aperture 11 therethrough near the ratchet ring 12.

As depicted in FIG. 2, the work head 14 is formed with a downwardly depending lug 28 of square cross section for engaging a workpiece, such as a socket for tightening and loosening nuts and bolts. Above the lug 28 there is a transverse disk shaped flange 23, the upper annular surface 25 of which rides in sliding contact with the ratchet ring 12. The disk shaped flange 23 has a knurled or otherwise roughened outer rim, visible in FIGS. 1 and 3. Above the central portion of the disk shaped flange 23 a configured bearing post 17 rises having a planar bearing wall 18 defined by a chordal division across the configuration of the post 17. A low segmental plateau relief 34 is defined above the flange 23 and adjacent to the chordal division of the post 17 defined by the planar bearing surface wall 18. The plateau relief 34 has an outer arcuate peripheral configuration. On the opposite side of the center of the post 17 there is a very high plateau relief 32 defined by a similar chordal demarcation wall 19. The plateau relief 32 has an arcuate outer periphery and is formed with its top in the shape of a segment of a circle. Together the plateaus 32 and 34 maintain the work head 14 in centered disposition within the generally circular cavity defined by the ring 12.

The construction of the ratcheting mechanism is apparent from FIG. 3. In this figure, the ratchet teeth 15 are shown extending entirely around the interior circular opening defined within the ratchet ring 12. The inner flat surface 30 of the bearing post 17 of the work head 14 is bounded by the two chordal walls 18 and 19 which, together with the circular opening in the ratchet ring 12, define two segmental cavities 50 and 51.

A pawl 20 is positioned within the segmental cavity 50. The pawl 20 is formed of hardened steel and is constructed generally with a cross section defined as a segment of a circle as illustrated in FIGS. 4 and 5. The pawl 20 has an outer convex surface 27 into which the outwardly directed teeth 22 are formed. Opposite that outer arcuate surface is an inner flat surface 36 which bears against the planar bearing surface 18 of the post 17 of the work head 14.

The pawl 20 is constructed with upper and lower flat planar surfaces 38 and 40 which are maintained perpendicular to the axial alignment of the work head 14 by the guide lip 24 and channel 26, as previously described. The planar surfaces 38 and 40 are captured within the confines of the plateau relief 34 of the workpiece 14 on one side and the inner flat surfaces of the indexing ring 42 on the other. A bore 43 normal to the planar surfaces 38 and 40 is defined in the pawl 20 adjacent to the inner flat surface 36 on its midline. The pawl 20 is thereby carried within a segmental cavity 50 within the ratchet ring 12 between the wall 18 and above the plateau relief 34.

Disposed above the ratchet ring 12 and the work head 14 is a flat, generally disk shaped indexing ring 42 having a raised interior face or boss 54 with a diameter approximately equal to the internal diameter of the opening of the ratchet ring 12. This permits the boss 54 to be seated in the opening therein. The indexing ring 42 has a fluted or otherwise roughened peripheral rim 56, visible in FIG. 1, that facilitates manual gripping to manipulate positioning of the pawl 20. At the undersurface of the indexing ring 42, an abutment finger in the form of a pin 76 is eccentrically mounted to depend inward to the segmental cavity 51.

Superimposed on the indexing ring 42 is a domed cap 58 which has a first central inwardly extending boss 60 that fits within the central aperture of the indexing ring 42. The cap 58 also has a second, smaller diameter, coaxial boss 62 which extends into bearing relationship with the inner flat transverse face 30 of the bearing post 17 of the work head 14. The cap 58 is bored at 64 and counterbored at 66 to receive the allen head cap screw 70, depicted in FIG. 2. The bearing post 17 of the work head 14 has a central bore 72 which is tapped for engagement by the threaded shank of cap screw 70. The ratchet mechanism in the torque wrench ratchet drive tool is thereby encapsulated.

A resilient spring biasing means in the form of a bifurcated spring 78 extends from the abutment pin 76 to the bore 43 on pawl 20. The bight of the bifurcated spring 78 is disposed about the end of pin 76. The spring 78 has two approximately helical legs 80 and 81 which extend across the upper flat surface 30 of the bearing post 17 bracketing and extending into engagement with the bore 43 of the pawl 20 with downwardly depending legs 82, shown in FIG. 2.

The operation of the ratcheting and guide mechanisms will be apparent from the following description of FIGS. 3 through 5. As shown in FIG. 3, the pin 76 is manipulated to its maximum counterclockwise position of travel by counterclockwise rotation of indexing ring 42 through an arc. In this position, spring 78 biases the pawl 20 into the upper portion of the segmental cavity 50 in FIG. 5. In this position, the ratchet teeth 22 of the pawl 20 are engaged with the mating ratchet teeth 15 in the ratchet ring 12 when the hinge 10 and ratchet ring 12 are rotated clockwise in a power stroke. It should be noted that at all times the radially outwardly directed lip 24 positioned midway along the length of the teeth 22 is in full engagement with the channel 26. This prevents the pawl 20 from tilting or cocking within the cavity 50 despite any irregularity of fit between the planar faces 38 and 40 of the pawl 20 and the confining surfaces of the plateau relief 34 and the underside of the indexing ring 42.

During the power stroke, the pawl 20 remains in the position depicted in FIG. 5. Upon initiation of the return stroke, which involves counterclockwise rotation of the ratchet ring 12, as depicted in FIG. 4, the teeth 15 of the ratchet ring 12 will move across and slip by the arcuate teeth 22 against the resilient bias of the spring 78. In this position, the pawl 20 lies with its flat bearing face 36 flush against the bearing wall 18 of the bearing post 17. It should be noted from FIG. 4 that the outwardly extending lip 24 still resides in at least partial registration in the channel 26 in the ratchet ring 12.

With each clockwise power stroke, the bias of the spring 78 will cause the mating teeth 22 and 15 to become locked in engagement so that rotational force imposed by the rotation of the ratchet ring 12 will be transmitted through the bearing surface 36 to the bearing wall 18. This imparts a clockwise rotational force to the work head 14. A corresponding selective locking of the mating teeth 15 and 22 together can be effectuated to achieve counterclockwise locked rotation of the hinge 10 and the work head 14 by grasping the serrated surface 56 of the indexing ring 42. The indexing ring 42 is rotated clockwise to bring the pin 76 from the position depicted in FIG. 3 to an opposite position in which it resides in the lower portion of the cavity 51. When in this position, the bias of the spring 78 will carry the pawl 20 downward, when viewed in FIGS. 4 and 5, with the bearing surface 36 moving in sliding engagement with the wall 18 of the bearing post 17 of the work head 14. As the pawl 20 moves, however, the projecting lip 24 continues to remain in at least partial registration in the channel 26 so that the pawl 20 cannot become tipped or cocked in the cavity 50 and be subjected to undue stress.

Numerous variations and modifications of the invention will undoubtedly become readily apparent to those familiar with torque wrenches and other ratcheting devices. For example, it will be readily apparent that an inwardly projecting lip could be provided about the interior surface of the ratchet ring 12 to ride in a corresponding groove or channel in the pawl 20. In another embodiment, a pair of projecting lips 24 could be provided at the upper and lower extremities of the teeth 22 defined in the convex surface 27 of the pawl 20. Undoubtedly other variations and modifications of the invention will be equally as suitable. Accordingly, the invention should not be construed as limited to the specific embodiment depicted and manner of operation described, but rather is defined in the claims appended hereto.

I claim:

1. In a torque wrench having a hinge with a ratchet body including a cavity formed with an interior wall element having a plurality of equally spaced, interiorally directed axially elongated ratchet body teeth, a work head received in said cavity for releasable coupling in rotation with said ratchet body, and a pawl element received within said cavity for translational travel transversely thereon and having an exterior arcuate surface with exteriorly directed teeth engageable with said ratchet body teeth and selectively operable to couple said work head and said ratchet body in rotation, the improvement comprising:

guide means for maintaining said teeth of said ratchet body and said teeth of said pawl in substantially axially parallel alignment and including male means rigidly mounted on one of said elements and projecting perpendicularily of the axial direction of said teeth and female means on the other of said elements and slidably receiving said male means for free relative translational movement between said male and female means in a plane perpendicular to said teeth.

2. The torque wrench of claim 1 further characterized in that said male means is formed by a lip projecting from one of said pawl and work head members and said female means is in the form of a channel for receiving said lip on the other of said pawl and work head element.

3. The torque wrench of claim 2 further characterized in that said lip extends outwardly from between the longitudinal extremities of said pawl, and said channel is formed by a circumferential groove extending radially outwardly into said arcuate wall of said cavity and in longitudinal alignment with said lip.

4. A torque applying device comprising:
   a lever handle terminating in a ratchet ring formed with an enlarged cavity therein and having a circumferential cavity wall with a concave surface bearing interiorally directed, axially projecting ratchet teeth;
   a work head aligned for rotation within said cavity about an axis co-extensive with the axial direction of said ratchet teeth and releasably engageable with said ratchet teeth for selective locked rotation with said ratchet ring;
   a pawl received in said cavity for translational travel therein and having a convex outer surface with outwardly directed means for engaging said ratchet teeth upon being shifted translationally therein to a position to hold said work head in locked rotational engagement with said ratchet ring;
   guide means including a guide surface formed by said ring and projecting perpendicular to the axial direction of said ratchet teeth and a tang projecting transversely from said pawl to slidingly engage said guide surface; and,
   pawl control means for governing the movement of said pawl relative to said ratchet ring and said work head in the plane of said ratchet ring.

5. The torque applying device of claim 4 is further characterized in that said ratchet ring is formed with a radial groove in said concave surface defining said guide surface, and said tang projects rigidly from said convex surface of said pawl and in registration in said groove.

6. The torque applying device of claim 4 further characterized in that said outwardly directed means of said pawl for engaging said ratchet teeth comprises a plurality of mating teeth.

7. In a ratchet wrench in which a ratchet ring element is alternatively engageable with and rotatable relative to a workpiece under the control of a pawl element interposed therebetween and shiftable translationally between first and second positions engaging respective first and second portions thereof with said ring element, the improvement wherein said ratchet ring element and said pawl element additionally comprise alignment means including an annular, track formed in one of said elements and a projection from the other of said elements and engaging said annular track for maintaining said pawl element aligned in a plane perpendicular to the axis of relative rotation between said ratchet ring and said workpiece.

8. The ratchet wrench of claim 7 further characterized in that said alignment means is in the form of an annular flange.

9. In a ratchet wrench having an internally toothed cylindrical ring element receiving a cylindrical work head therein for selective rotation or free wheeling relative thereto and cooperating therewith to form on one side thereof a cavity opening against the teeth of said ring and further including a transversely elongated pawl having oppositely disposed toothed extremities for selective engagement with the teeth of said ring, said pawl being held captive in said cavity for translation longitudinally therein to engage one extremity or the other with such ring teeth, the improvement characterized by:
guide means slidably interconnecting said pawl and ring and including a rigid male element projecting radially of said ring and a complimentarily shaped female element slidably receiving said male element for free translational shifting of said pawl for engagement of one toothed extremity or the other thereof with the teeth of said ring.

* * * * *